R. Evarts.
Steering App's.

No. 1925. Patented Jan. 5. 1841.

UNITED STATES PATENT OFFICE.

RUSSELL EVARTS, OF MADISON, CONNECTICUT.

APPARATUS FOR STEERING STEAMBOATS.

Specification of Letters Patent No. 1,925, dated January 5, 1841.

*To all whom it may concern:*

Be it known that I, RUSSELL EVARTS, of Madison, in the county of New Haven and State of Connecticut, have invented a new and useful Mode of Steering Vessels, Particularly Steamboats, which is described as follows, reference being had to the annexed drawing of the same, making part of this specification.

Figure 2:
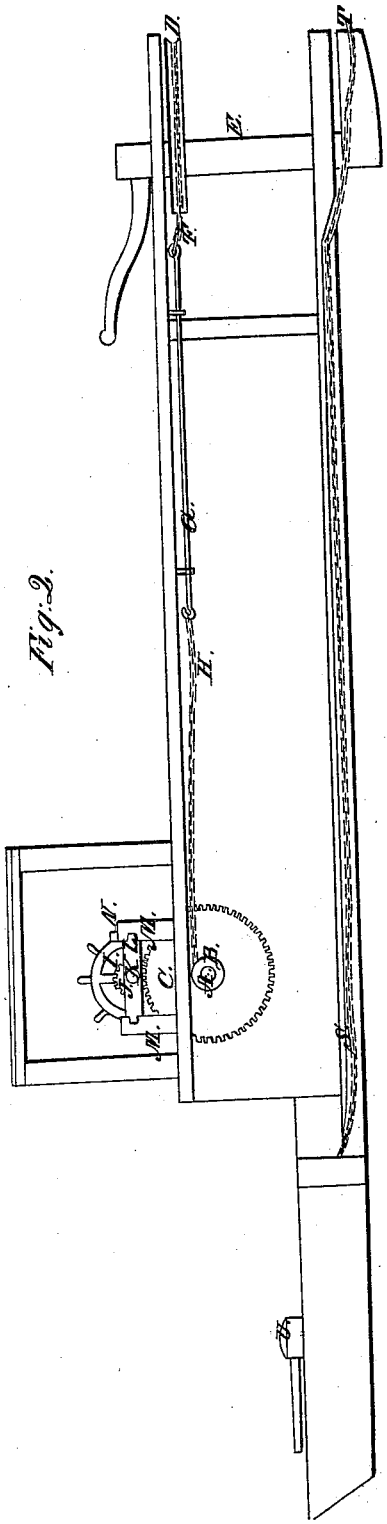
Figure 1:
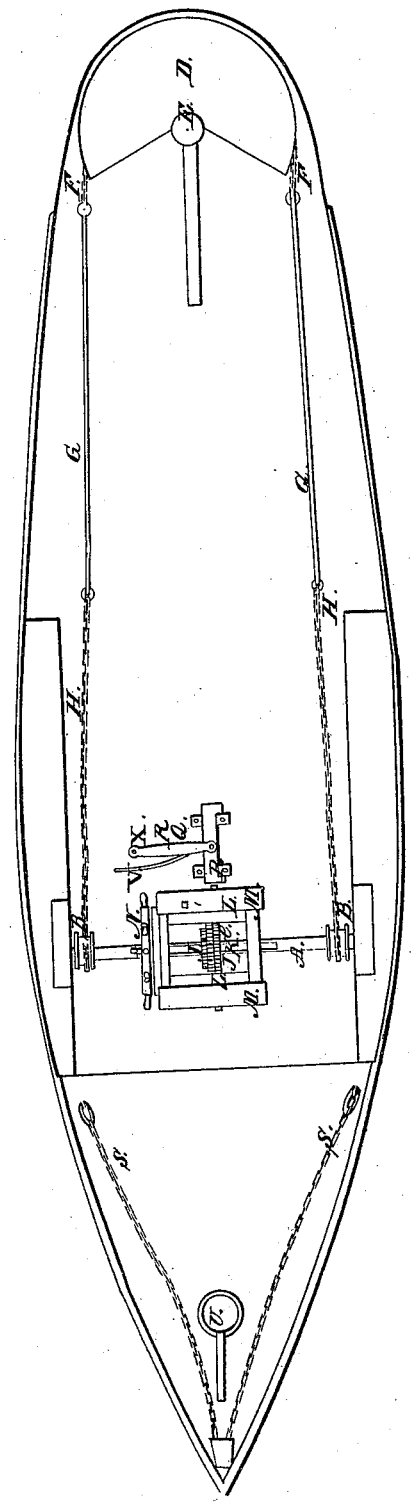

Figure 1 is plan of the steering apparatus, the promenade deck being removed in order to show that part of it which is under said deck. Fig. 2 is a side elevation.

Similar letters refer to similar parts in the figures.

A part of this steering apparatus is placed under the promenade deck and a part in the wheel-house above said deck.

A shaft A is placed athwart the vessel under the promenade deck, turning in suitable boxes fixed in the sides of the vessel, on which shafts are fixed, near its extremities, two grooved drums B B; and near the middle two cog wheels C C, one of greater diameter than the other. These two wheels form part of the cogged gearing for turning said shaft and drums.

A segment grooved wheel D is fixed to the after part of the rudder stock E around which is passed a chain F made fast to it at the vertex of the curve; and to the extremities of said chain are secured iron rods G G (one to each end on each side of the vessel) running forward under the promenade deck beyond midships to within a short distance of the drums, at which place they are attached to chains H H wound around the grooved drums on the horizontal shaft before described. The two cog-wheels on the horizontal shaft extend up through the promenade deck, into which are geared alternately, as a quick or a slow motion is required, a large and small cog wheel I J placed above the promenade deck in the wheel-house, for steering quick or slow. These last-mentioned cog-wheels are fixed on a horizontal shaft K placed above the promenade deck, in the wheel-house, turning in boxes in a horizontal sliding frame L moving athwartship (or fore and aft if desired) in grooves in parallel blocks M fastened to the deck. On the last-mentioned shaft is fixed the hand, or steering wheel N made in the usual manner.

The steering apparatus can be placed above the promenade as well as below it, or in any convenient situation. To put the helm either starboard or larboard the helmsman lays hold of the handles of the steering wheel N and turns said wheel to the right or left. The small cog-wheel I on the shaft of the steering wheel turns the large cog-wheel C on the shaft carrying the grooved drums B which winds around one of said drums, one of the chains H, and at the same time unwinds the other chain H from the other drum B and being connected to the segment wheel on the rudder by the intermediate rods and chain causes the rudder to turn with great ease.

It will be perceived that the helmsman has great purchase over the rudder by the before-described combination of pinions, cog-wheels, shafts, drums, chains, rods and segment purchase wheel, and that the purchase is always the same in whatever position the rudder may be, by means of said segment wheel, because it gives the same length of leverage, which is equal to the semidiameter of the segment wheel and is always at right angles to the diameter. Whereas in the old mode of steering when the rudder is hard to port and it is desired to bring it to the starboard, it becomes very difficult to move the rudder on account of the direction of the drawing of the chains, being in a line nearly parallel with the direction of the rudder.

On the under side of the promenade deck is arranged a sliding bolt P for locking the gearing, in order to hold the helm, by pushing said bolt into one of the spaces between the teeth of the cog-wheel C on the drum shaft. This bolt is attached to the end of a lever Q, whose fulcrum is near its center at R and is inserted in the underside of the deck, the other end of which lever turns up at X at right angles and passes through an opening in the deck and is operated on by the foot of the helmsman, to lock the gearing by pushing it aft. To unlock the bolt the helmsman removes his foot from the lever, when a spring V attached to the bolt throws it back to its former position.

The following described apparatus may be used in case the before-described apparatus should get out of order, or be inaccessible through fire or other cause. It consists of life chains S S, attached to the back part of the rudder T and leading along in grooves or boxings in the main gunwales forward to the capstan U, to which it may be geared when necessary. These chains are to be used in case of accident, as before mentioned.

What I claim as my invention, and desire to secure by Letters Patent, consists in—

1. Attaching a segment grooved wheel to the head of the rudder, around which the steering chains are passed, and to which they are made fast in such manner that the purchase shall always be at right angles to the diameter, in combination with the grooved drums on the horizontal shaft around which the steering chains are wound, one on each side, and the gearing for turning said drums at a quicker or slower speed by the arrangement of the cog-wheels in the sliding frame, as before described.

2. Also the arrangement of the life chains leading from the rudder to the windlass as before described, along the gunwales.

RUSSELL EVARTS.

Witnesses:
WILLIAM P. ELLIOT,
EDMUND MAHER.